United States Patent [19]

Okutomi et al.

[11] Patent Number: 5,690,986
[45] Date of Patent: Nov. 25, 1997

[54] OIL-IN-WATER TYPE EMULSION AND PROCESS FOR PRODUCING THE SAME

[75] Inventors: Yasuo Okutomi; Toshihiro Shimada, both of Tokyo, Japan

[73] Assignee: Asahi Denka Kogyo Kabushiki Kaisha, Tokyo, Japan

[21] Appl. No.: 618,175

[22] Filed: Mar. 19, 1996

[30] Foreign Application Priority Data

Apr. 14, 1995 [JP] Japan .................................. 7-089889

[51] Int. Cl.⁶ .................................................. A23D 7/00
[52] U.S. Cl. .................................................. 426/604; 426/656
[58] Field of Search ....................................... 426/604, 662, 426/654, 656

[56] References Cited

U.S. PATENT DOCUMENTS 4,119,564 10/1978 Van Dam .
5,082,674 1/1992 Carrell .................................... 426/654

FOREIGN PATENT DOCUMENTS 0166284 1/1986 European Pat. Off. .
0426211 5/1991 European Pat. Off. .
0716811 6/1996 European Pat. Off. .
58-201956 11/1983 Japan .

OTHER PUBLICATIONS

K. Thome et al., "The foaming properties of cream"Milch-wissenschaft, vol. 28, No. 9, 1973, pp. 554–558.
C. Dutilh et al., "Improvement of Product Attributes of Mayonnaise by Enzymic Hydrolysis of Egg Yolk with Phospholipase $A_2$", J. Sci. Food Agric., vol. 32, 1981, pp. 451–458.

*Primary Examiner*—Carolyn Paden
*Attorney, Agent, or Firm*—Young & Thompson

[57] ABSTRACT

An oil-in-water type emulsion is disclosed which contains (1) an emulsifying agent, (2) a lysophospholipoprotein, and (3) a protein other than the lysophospholipoprotein (2), (4) oil and (5) water the protein (3) having a larger molecular weight than the protein. (2) A process for producing the same composition includes preliminarily emulsifying an aqueous phase containing the emulsifying agent (1) and the lysophospholipoprotein (2) with an oil phase, homogenizing the emulsion, and then adding the protein (3) to the homogenate. Alternately the oil and water components containing the emulsifying agent (1) and the lysophospholipoprotein (2) are emulsified by means of a membrane emulsifier and then the protein (3) is added thereto.

21 Claims, No Drawings

OIL-IN-WATER TYPE EMULSION AND PROCESS FOR PRODUCING THE SAME

BACKGROUND OF THE INVENTION

1. Field of the Invention

This invention relates to an oil-in-water type emulsion which has a fresh cream-like fresh texture, spreads its flavor in the mouth naturally like fresh cream, and is easy to handle like vegetable cream; and to a process for producing the same.

2. Description of the Related Art:

Japanese Patent Publication No. 81408/91 discloses a process for preparing a foamable oil-in-water type emulsion composition having a flavor close to whipped cream made of natural fresh cream and improved physical properties, which comprises using 100 to 200 mg/100 ml of a divalent metal, 100 to 200 mg/100 ml of a monovalent metal, and 0.08 to 30% by weight of casein each based on the composition to artificially form fat droplets which are equal to milk fat droplets of fresh cream in size and interfacial strength.

The composition obtained by the above process has its flavor and physical properties improved to some extent but not to a fully satisfactory extent.

SUMMARY OF THE INVENTION

An object of the present invention is to provide an oil-in-water type emulsion which has a fresh cream-like fresh texture, spreads its flavor in the mouth naturally like fresh cream, excels fresh cream in palatability, and exhibits excellent heat shock resistance and machining resistance as observed with vegetable cream and is therefore easy to handle; and a process for producing the same.

The inventors of the present invention have extensively investigated the emulsified structure of natural fresh cream. As a result, they have found that incorporation of an emulsifying agent and specific proteins affords an ideal oil-in-water type emulsion endowed with enhanced properties characteristic both of natural fresh cream and of vegetable cream and thus accomplished the above object.

The invention has been completed based on the above finding and provides an oil-in-water type emulsion comprising (1) an emulsifying agent, (2) a lysophospholipoprotein, and (3) a protein other than the lysophospholipoprotein as component (2), the protein (3) having a larger molecular weight than the protein as component (2).

The invention also provides an oil-in-water type emulsion comprising (1) an emulsifying agent, (2) a lysophospholipoprotein, (2') a phospholipoprotein, and (3) a protein other than the proteins as components (2) and (2'), the protein (3) having a larger molecular weight than the proteins as components (2) and (2').

The invention further provides a process for producing the above-mentioned oil-in-water type emulsion, which comprises preliminarily emulsifying a composition containing the emulsifying agent (1) and the lysophospholipoprotein (2), homogenizing the emulsion, and then adding the protein (3) to the homogenate; and a process for producing the above-mentioned oil-in-water type emulsion, which comprises emulsifying a composition containing the emulsifying agent (1) and the lysophospholipoprotein (2) by means of a membrane emulsifier and then adding thereto the protein (3).

The oil-in-water type emulsion according to the present invention has a fresh cream-like fresh texture, spreads its flavor in the mouth naturally like fresh cream, excels fresh cream in palatability, and exhibits excellent heat shock resistance and machining resistance like vegetable cream and is therefore easy to handle.

According to the process of the invention, the above-mentioned oil-in-water type emulsion can be obtained.

DETAILED DESCRIPTION OF THE INVENTION

The oil-in-water type emulsion of the invention will be described below in detail.

The oil-in-water type emulsion of the invention is used chiefly as cream to be beaten into whipped cream. It is also useful as material of confectioneries and dishes, coffee creamer, and material to be added to ice cream or dough.

The characteristics of the oil-in-water type emulsion of the invention reside in that the fat droplets have adsorbed onto the bilayer of different protein thereof (1) an emulsifying agent, (2) a lysophospholipoprotein (or (2) a lysophospholipoprotein and (2') a phospholipoprotein), and (3) a protein in this order.

That is, emulsification is carried out under the condition that the protein (3) has a larger apparent molecular weight than the lysophospholipoprotein (2) (and the phospholipoprotein (2')) to provide an oil-in-water type emulsion having the aforementioned emulsified structure. If the apparent molecular weight of the protein (3) is smaller than that of the lysophospholipoprotein (2), the order of adsorption to the surface of the fat droplets would be reversed, and an oil-in-water type emulsion having the above-described emulsified structure cannot be obtained.

An oil-in-water type emulsion having proteins adsorbed on the droplets in such a reversed order not only takes a considerably long time to become thick and stiff as desired upon being beaten as compared with the oil-in-water type emulsion of the invention, but also has seriously poor heat shock resistance. The terminology "heat shock resistance" as referred to above is used in the following manner. When an oil-in-water type emulsion is allowed to stand at a temperature higher than the usual storage temperature for cream (i.e., 5° to 10° C.) for several to several tens of hours, again cooled to the storage temperature, and then beaten, if it fails to provide whipped cream having appropriate cream properties, the emulsion is recognized to have "poor heat shock resistance". Specifically, poor heat shock resistance is accompanied by an increase in viscosity, a reduction in beating time, a reduction in overrun, hardening of cream, etc.

The oil-in-water type emulsion of the invention in which the fat droplets have a bilayer structure composed of the emulsifying agent (1), the lysophospholipoprotein (2) and the protein (3) in this order from the inner side toward the outer side, the protein (3) having a larger apparent molecular weight than the lysophospholipoprotein (2) (and the phospholipoprotein (2')), have the following advantages. When beaten to mix air in, the cream has markedly improved water retention even when allowed to stand at room temperature and, when eaten, gives intensified freshness and spreads its flavor in the mouth in a very natural way.

The protein (3) most preferably includes casein micelles and casein micelle-containing materials. Examples of the casein micelle-containing materials include skim milk powder, whole fat milk powder, butter milk powder, skim milk, whole fat milk, fresh cream, various condensed or evaporated milk products, total milk protein, and the like.

While varying depending on the material, the protein (3) is usually used in an amount of 1 to 30% by weight (hereinafter all the percents are given by weight) based on the total oil-in-water type emulsion. Taking skim milk powder for instance, it is preferably used in an amount of 2 to 6%, still preferably 3 to 5%, based on the total oil-in-water type emulsion for use as cream with air mixed in. If the amount of skim milk powder is less than 2%, the product is short of a milk flavor and fails to have sufficient water retention. If it exceeds 6%, the product has too strong a milk flavor and an increased viscosity which is disadvantage for handling. For use in dough, the amount of the protein (3) to be added is not limited to the above range. For example, a concentrated milk product can be used in an amount as large as 10 to 20%.

Since casein micelles are destroyed by physical force, application of extreme pressure should be avoided in homogenizing. It is recommended to use a centrifugal homogenizer which is relatively less causative of casein micelle destruction.

Molecular weights of typical proteins are shown in Table 1 below.

TABLE 1

| Protein | Molecular Weight |
|---|---|
| Casein micelles | $6.0 \times 10^8$ |
| Casein submicelles | $2.5 \times 10^5$ |
| Casein monomers: | |
| $\alpha_{s1}$-Casein | $2.3 \times 10^4$ |
| $\beta$-Casein | $2.3 \times 10^4$ |
| $\beta$-Casein | $1.9 \times 10^4$ |
| $\alpha$-Lactalbumin | 14,146 |
| | $(1.4 \times 10^4)$ |
| $\beta$-Lactalbumin | 18,362 |
| | $(1.8 \times 10^4)$ |
| Lysophospholipoprotein (egg yolk $LDL_1$) | $1.0 \times 10^7$ |
| Lysophospholipoprotein (egg yolk $LDL_2$) | $3.3 \times 10^6$ |

Where the molecular weight of a protein to be used as component (3) is smaller than that of the lysophospholipoprotein (2), for example, where lactalbumin is used, it is necessary before use that the lactalbumin be subjected to heat treatment in an aqueous solution to polymerize to such a degree that would not affect the taste to thereby make its apparent molecular weight substantially equal to or higher than that of the lysophospholipoprotein (2).

The heat treatment is suitably carried out at a temperature at which lactalbumin may undergo thermal denaturation, e.g., 60° C. or higher, for several tens of minutes to several hours. In case where a protein increases its molecular weight too much to an extent adversely affecting the taste, it is necessary to grind the heat treated protein in a grinder, such as a colloid mill, to a desired size.

In using sodium caseinate, calcium caseinate, casein submicelles or a casein submicelle-containing material, each of which has a smaller molecular weight than the lysophospholipoprotein (2), it is required before use that the pH of an aqueous solution containing one or more of these proteins be reduced to polymerize the protein(s) to such an extent that would give no adverse influence to the taste, or a calcium salt or a magnesium salt be added to the aqueous solution to thereby make the apparent molecular weight substantially equal to or higher than that of the lysophospholipoprotein (2).

The pH reduction is preferably conducted in the presence of a phosphate in order to avoid appreciable aggregation.

After the treatment, the pH of the aqueous solution may be restored with a pH adjusting agent to improve the taste.

The lysophospholipoprotein which can be used as component (2) in the present invention is a complex of a lysophospholipid and a protein and has utterly different properties from either lysophospholipids or proteins. The complex is not formed even if a lysophospholipid and a protein exist in a system.

The lysophospholipoprotein (2) is obtained by treating a phospholipoprotein or a phospholipoprotein-containing material, such as egg yolk, whole egg, butter milk powder, butter milk, soybean protein or wheat protein, with phospholipase A.

Phospholipase A is an enzyme serving to sever the linkage connecting the glycerol part and the fatty acid residue in phospholipid molecules and to replace the fatty acid residue with a hydroxyl group. Of phospholipase A species, phospholipase $A_2$ selectively cuts off the fatty acid residue at the 2-position of the glycerol part of phospholipid molecules. Phospholipase A species are classified into $A_1$ and $A_2$ according to the site on which it acts. Phospholipase $A_2$ is preferred.

The novel structure of the oil-in-water type emulsion of the invention brings about various effects. In particular, the use of the lysophospholipoprotein (2) produces two significant effects: improvement in machining resistance and improvement in heat shock resistance. The terminology "machining resistance" as referred to above is used in the following manner. When cream is frothed by beating by means of machinery, such as a continuous beating machine, cases sometimes occur in which the cream undergoes phase reversal due to the physical impact of the machine and becomes useless, or the cream has extremely narrow latitude in selecting operation conditions of the machine for acquiring prescribed stiffness enough to handle. Further, when whipped cream is spread on cake or shaped into cake decorations, such as flowers, by means of a coating machine, a topping machine, etc., cases sometimes occur in which the cream becomes harder and less workable with time due to the impact from the machine. Such being the case, the cream is recognized to have poor machining resistance.

A phospholipoprotein per se is not observed to produce the above-mentioned effects.

The amount of the lysophospholipoprotein (2) to be used is determined with the amount of the lysophospholipid bound to protein as a measure. The lysophospholipoprotein (2) is preferably used in an amount of 0.005 to 0.1%, still preferably 0.02 to 0.75%, in terms of the lysophospholipid portion thereof, based on the total oil-in-water type emulsion.

Assuming that the conversion from a phospholipoprotein to a lysophospholipoprotein is 75%, the above preferred and still preferred ranges correspond to 0.07 to 1.3%, and 0.27 to 1.0%, respectively, of egg yolk based on the total oil-in-water type emulsion. The amount of enzymatically treated egg yolk to be used varies depending on the conversion to the lysophospholipoprotein (2).

If the amount of the lysophospholipoprotein used is less than 0.005% in terms of the lysophospholipid portion, the oil-in-water type emulsion has insufficient machining resistance and heat shock resistance and tends to fail to exhibit an enhanced fresh texture of fresh cream and natural spreadability of the flavor in the mouth, which are characteristic of the oil-in-water type emulsion of the invention. If the amount of the lysophospholipoprotein used exceeds 0.1%, in terms of lysophospholipid portion, the whipped cream prepared tends to return to cream with time.

The "conversion to the lysophospholipoprotein (2)" as referred to above is expressed in terms of the ratio of the total of lysophosphatidylcholine and lysoethanolamine after conversion to the total of phosphatidylcholine and phosphatidylethanolamine before conversion. The conversion of the lysophospholipoprotein (2) is preferably 10% or higher, still preferably 40 to 60%, and particularly preferably 60 to 90%. The higher the conversion, the more the lysophospholipoprotein can be saved.

Phospholipoproteins of milk are contained in fresh cream (45% fat) in a proportion of about 0.7%, which corresponds to about 0.2 to 0.3% in terms of phospholipids, and the lysophospholipids in the phospholipids amount to only 0.8% (see *Milk Sogo Jiten*, Asakura Shoten).

The above content corresponds to only about 0.002% based on fresh cream (45% fat). That is to say fresh cream does not contain a substantial amount of lysophospholipoproteins enough to influence the quality.

The phospholipoprotein (2') which can be used in combination, with the lysophospholipoprotein (2) includes phospholipoproteins and Phospholipoprotein-containing materials.

The phospholipoprotein (2') is preferably used in an amount of 0.1 to 1.0%, in terms of the total Phospholipoproteins inclusive of the unreacted phospholipoprotein used in preparing the lysophospholiporotein (2), based on the total oil-in-water type emulsion.

The emulsifying agent which can be used as component (1) in the invention is not limited in kind as long as it is capable of reducing interfacial tension and providing whipped cream having satisfactory physical properties.

It is preferred, however, to use one or more emulsifying agents that inhibit formation of clusters. Examples of such emulsifying agents are lecithin, glycerol diacetyltartaric acid fatty acid esters, glycerol citric acid fatty acid esters, glycerol succinic acid fatty acid esters, sucrose fatty acid esters, polyglycerol fatty acid esters, glycerol lactic acid fatty acid esters, and polyoxyethylene sorbitan fatty acid esters.

The lecithin may be any of vegetable lecithin, egg yolk lecithin, fractionated lecithin, hydrogenated lecithin, enzymatically decomposed lecithin, and enzymatically treated lecithin. The polyglycerol fatty acid esters are not limited as long as they contain polyglycerides having a degree of polymerization of 3 (trimers) or more in a proportion of at least 50%.

The emulsifying agent (1) is preferably used in an amount of 0.1 to 2% based on the total oil-in-water type emulsion.

The content of fats and oils in the oil-in-water type emulsion of the invention is preferably 15 to 75%. If it is less than 15%, the emulsion tends to fail to froth sufficiently or the resulting whipped cream tends to have unsatisfactory shape retention. If it exceeds 75%, on the other hand, the emulsion has too high a viscosity for preparation.

The fats and oils which can be used in the invention are not particularly limited. Preferred fats and oils include naturally-occurring animal or vegetable fats and oils, synthetic triglycerides, processed fats and oils obtained by subjecting the above-described fats and oils to hydrogenation, isomerization, interesterification, fractionation, or the like treatment, and mixtures of two or more thereof. Those having a solid fat content (SFC) of 40 to 85 at 5° C. and an ascending melting point of 20° to 40° C. are particularly preferred. Examples of such fats and oils include animal or vegetable fats and oils, such as soybean oil, cotton seed oil, corn oil, safflower oil, palm oil, coconut oil, rapeseed oil, rice oil, milk fat, lard, beef tallow, fish oil, cacao fat, various tempered hard butter products; and processed fats and oils obtained by subjecting these fats and oils to hydrogenation, isomerization, interesterification, fractionation or the like treatment.

The aqueous phase of the oil-in-water type emulsion of the invention contains the emulsifying agent (1) (where the emulsifying agent is water-soluble), the lysophospholipoprotein (2), and the protein (3) whose apparent molecular weight is larger than that of component (2). If desired, the aqueous phase may contain sugars, such as sucrose, fructose, glucose, lactose, maltose, starch syrup, and sugar alcohol; stabilizers, such as guar gum, xantham gum, tamarind seed gum, carrageenan, alginates, furcellaran, locust bean gum, pectin, curdlan, starch, processed starch, crystalline cellulose, gelatin, dextrin, agar, and dextran; colorants, perfumes, chocolate, cocoa, cacao mass, fruit juice, jam, and the like.

The process for preparing the oil-in-water type emulsion of the invention will then be described below.

The oil-in-water type emulsion of the invention is obtained by preliminarily emulsifying an aqueous phase comprising the lysophospholipoprotein (2), the protein (3), the emulsifying agent (1) (in case where the emulsifying agent is water-soluble) and, if desired, additives such as a stabilizer and a perfume and an oily phase comprising the emulsifying agent (1) (in case where the emulsifying agent is oil-soluble) and, if desired, additives such as a perfume at about 45° to 75° C., homogenizing the emulsion either before or after pasteurization or sterilization, and cooling the homogenate.

Another process, which is more effective, comprises preliminarily emulsifying an aqueous phase having dissolved therein the emulsifying agent (1) and the lysophospholipoprotein or lysophospholipoprotein-containing material (2) and an oily phase, homogenizing the emulsion, and adding the protein (3) thereto.

The homogenizing is preferably carried out by using a centrifugal homogenizer.

Alternatively, an aqueous phase having dissolved therein the emulsifying agent (1) and the lysophospholipoprotein or lysophospholipoprotein-containing material (2) and an oily phase can be emulsified in a membrane emulsifier, followed by addition of the protein (3).

If addition of the protein (3) precedes the addition of the lysophospholipoprotein (2), the lysophospholipoprotein (2) and the protein (3) are adsorbed onto the surface of fat droplets in this order. This order of adsorption is not substantially influenced by the order or the timing of addition owing to the differences between the lysophospholipoprotein (2) and the protein (3) in mobility and adsorbability.

The oil-in-water type emulsion of the invention is used chiefly as cream to be beaten into whipped cream and, in addition, as material for confectioneries, material for dishes, coffee creamer, and material to be added to ice cream or dough. It can be mixed with fresh cream without losing its characteristics. It may be sold on the market in the form of whipped cream under a freezing, chilling or ambient temperature condition for storage and distribution.

The present invention will now be illustrated in greater detail with reference to Examples and Comparative Examples, but it should be understood that the invention is not construed as being limited thereto.

EXAMPLE 1

To 99.97% of egg yolk was added 0.03% of Lecitase 10-L® (produced by NOVO NORDISK Bioindustry Co., Ltd.; containing 10000 IU/ml of phospholipase $A_2$) while stirring. The resulting mixture was incubated at 50° C. for 4 hours and preserved at 5° C. The conversion of the lysophospholipoprotein was 76.6% (about 7.6% in terms of lysophospholipid content). Using the resulting lysophospholipoprotein-containing material, an oil-in-water type emulsion was prepared according to the following formulation:

| Hardened soybean oil | 22.0% |
|---|---|
| Milk fat | 19.0% |
| Coconut oil | 4.0% |
| Skim milk powder | 4.0% |
| Lysophospholipoprotein-containing material | 0.45% |
| Sucrose fatty acid ester | 0.2% |
| Lecithin | 0.5% |
| Glycerol diacetyltartaric acid fatty acid ester | 0.1% |
| Glycerol lactic acid fatty acid ester | 0.1% |
| Flavoring agent | 0.5% |
| Water | 49.15% |

The lysophospholipid content in the emulsion was 0.034%.

The skim milk powder, lysophospholipoprotein-containing material, sucrose fatty acid ester and flavoring agent were dissolved in water heated at 60° C. while stirring to prepare an aqueous phase. Separately, the hardened soybean oil, milk fat, coconut oil, lecithin, glycerol diacetyltartaric acid fatty acid ester and glycerol lactate fatty acid ester were mixed and dissolved at 60° C. to prepare an oily phase. The oily phase was added to the aqueous phase, and the mixture was preliminarily emulsified by stirring. The emulsion was homogenized under a pressure of 50 kg/cm², sterilized at 142° C. for 4 seconds in VTIS (an ultra-high temperature (UHT) sterilizer manufactured by Alfa Laval Co.), again homogenized under a pressure of 50 kg/cm², and cooled to 5° C., followed by aging in a refrigerator for 24 hours. The resulting oil-in-water type emulsion exhibited markedly excellent properties and flavor as shown in Table 2 below.

EXAMPLES 2 TO 8

Oil-in-water type emulsions were prepared in the same manner as in Example 1 except for changing the amount of the lysophospholipoprotein-containing material to 0.075%, 0.15%, 0.3%, 0.6%, 0.75%, 0.95% or 1.3% and adjusting the water content accordingly. The lysophospholipid content in the resulting oil-in-water type emulsions was 0.006%, 0.011%, 0.023%, 0.046%, 0.057%, 0.072%, and 0.098%, respectively. The quality properties of these emulsions were satisfactory as shown in Tables 2, 3 and 4.

EXAMPLE 9

An oil-in-water type emulsion was prepared using the lysophospholipoprotein-containing material prepared in Example 1 according to the following formulation:

| Hardened soybean oil | 22.0% |
|---|---|
| Palm kernel oil | 19.0% |
| Corn oil | 4.0% |
| Skim milk powder | 5.0% |
| Lysophospholipoprotein-containing material | 0.75% |
| Sucrose fatty acid ester | 0.2% |
| Lecithin | 0.5% |
| Glycerol diacetyltartaric acid fatty acid ester | 0.2% |
| Flavoring agent | 0.5% |
| Sodium hexametaphosphate | 0.02% |
| Water | 47.83% |

The emulsion had a lysophospholipid content of 0.057%.

The skim milk powder, lysophospholipoprotein-containing material, sucrose fatty acid ester, sodium hexametaphosphate, and flavoring agent were dissolved in water heated at 60° C. while stirring to prepare an aqueous phase. Separately, the hardened soybean oil, palm kernel oil, corn oil, lecithin, and glycerol diacetyltartaric acid fatty acid ester were mixed and dissolved at 60° C. to prepare an oily phase. The oily phase was added to the aqueous phase, and the mixture was preliminarily emulsified by stirring. The emulsion was homogenized under a pressure of 50 kg/cm², sterilized at 142° C. for 4 seconds in VTIS (a UHT sterilizer manufactured by Alfa Laval Co.), again homogenized under a pressure of 50 kg/cm², and cooled to 5° C., followed by aging in a refrigerator for 24 hours. The resulting oil-in-water type emulsion exhibited markedly excellent properties and flavor as shown in Table 4 below.

COMPARATIVE EXAMPLE 1

An oil-in-water type emulsion was prepared using the lysophospholipoprotein-containing material prepared in Example 1 and in addition lactalbumin as other protein according to the following formulation:

| Hardened rapeseed oil | 28.0% |
|---|---|
| Milk fat | 13.0% |
| Palm kernel oil | 4.0% |
| Lactalbumin | 1.5% |
| Lysophospholipoprotein-containing material | 0.60% |
| Sucrose fatty acid ester | 0.2% |
| Lecithin | 0.5% |
| Glycerol diacetyltartaric acid fatty acid ester | 0.1% |
| Glycerol lactic acid fatty acid ester | 0.1% |
| Flavoring agent | 0.5% |
| Water | 51.50% |

The emulsion had a lysophospholipid content of 0.046%.

The lactalbumin, lysophospholipoprotein-containing material, sucrose fatty acid ester, and flavoring agent were dissolved in water heated at 60° C. while stirring to prepare an aqueous phase. Separately, the hardened rapeseed oil, milk fat, palm kernel oil, lecithin, glycerol diacetyltartaric acid fatty acid ester, and glycerol lactic acid fatty acid ester were mixed and dissolved at 60° C. to prepare an oily phase. The oily phase was added to the aqueous phase, and the mixture was preliminarily emulsified by stirring. The emulsion was homogenized under a pressure of 50 kg/cm², sterilized at 142° C. for 4 seconds in VTIS (a UHT sterilizer manufactured by Alfa Labval Co.), again homogenized under a pressure of 50 kg/cm², and cooled to 5° C., followed by aging in a refrigerator for 24 hours. The resulting oil-in-water type emulsion required a long beating time and exhibited considerably deteriorated heat shock resistance as shown in Table 7 below.

COMPARATIVE EXAMPLES 2 TO 4

Oil-in-water type emulsions were prepared in the same manner as in Comparative Example 1 except for replacing lactalbumin used as other protein with sodium caseinate, total milk protein or a casein decomposition product. The resulting emulsions all required an extended beating time and showed considerably deteriorated heat shock resistance as shown in Tables 7 and 8 below. Those using sodium caseinate and a casein decomposition product were especially poor in water retention at 20° C.

COMPARATIVE EXAMPLE 5

An oil-in-water type emulsion was prepared in the same manner as in Example 9, except for replacing the lysophospholipoprotein-containing material with 0.75% of egg yolk as phospholipoprotein-containing material and replacing lecithin with 0.130% of lysolecithin (lyso form content: 44%) so as to give the same iysophospholipid content as in the formulation of Example 9, according to the following formulation:

| | |
|---|---|
| Hardened soybean oil | 22.0% |
| Palm kernel oil | 19.0% |
| Corn oil | 4.0% |
| Skim milk powder | 5.0% |
| Egg yolk | 0.75% |
| Sucrose fatty acid ester | 0.2% |
| Lysolecithin | 0.13% |
| Glycerol diacetyltartaric acid fatty acid ester | 0.2% |
| Flavoring agent | 0.5% |
| Sodium hexametaphosphate | 0.02% |
| Water | 48.2% |

The lysolipid content in the emulsion was 0.057%.

The resulting oil-in-water type emulsion was inferior in all terms of flavor, machining resistance, and heat shock resistance. With respect to flavor, in particular, bitterness peculiar to lysolecithin was felt. A lysophospholipoprotein does not taste bitter probably because of its structure in which lysolecithin is bound to a protein. Therefore, taste of bitterness is an effective criterion for organoleptic evaluation for the use of lysolecithin or a lysophospholipoprotein.

COMPARATIVE EXAMPLE 6

Conventional standard cream was prepared according to the following formulation.

| | |
|---|---|
| Hardened soybean oil | 22.0% |
| Milk fat | 19.0% |
| Coconut oil | 4.0% |
| Skim milk powder | 4.0% |
| Sorbitan fatty acid ester | 0.05% |
| Sucrose fatty acid ester | 0.3% |
| Lecithin | 0.2% |
| Glycerol fatty acid ester | 0.15% |
| Flavoring agent | 0.5% |
| Sodium hexametaphosphate | 0.1% |
| Water | 49.7% |

The skim milk powder, sucrose fatty acid ester, sodium hexametaphosphate, and flavoring agent were dissolved in water heated at 60° C. while stirring to prepare an aqueous phase. Separately, the hardened soybean oil, milk fat, coconut oil, lecithin, glycerol fatty acid ester, and sorbitan fatty acid ester were mixed and dissolved at 60° C. to prepare an oily phase. The oily phase was added to the aqueous phase, and the mixture was preliminarily emulsified by stirring. The emulsion was homogenized under a pressure of 50 kg/cm², sterilized at 142° C. for 4 seconds in VTIS (a UHT sterilizer manufactured by Alfa Labval Co.), again homogenized under a pressure of 50 kg/cm², and cooled to 5° C., followed by aging in a refrigerator for 24 hours. The resulting oil-in-water type emulsion was found sadly lacking in fresh texture and natural spread of flavor in the mouth as shown in Table 8 below.

EXAMPLE 10

A low fat oil-in-water emulsion was prepared by using the lysophospholipoprotein-containing material prepared in Example 1 according to the following formulation:

| | |
|---|---|
| Hard butter | 20.0% |
| Palm kernel oil stearin | 5.0% |
| Skim milk powder | 5.0% |
| Lysophospholipoprotein-containing material | 0.75% |
| Sucrose fatty acid ester | 0.2% |
| Lecithin | 0.5% |
| Glycerol diacetyltartaric acid fatty acid ester | 0.2% |
| Flavoring agent | 0.5% |
| Water | 67.85% |

The lysophospholipid content of the emulsion was 0.057%.

The skim milk powder, lysophospholipoprotein-containing material, sucrose fatty acid ester, and flavoring agent were dissolved in water heated at 60° C. while stirring to prepare an aqueous phase. Separately, the hard butter, palm kernel oil stearin, lecithin, and glycerol diacetyltartaric acid fatty acid ester were mixed and dissolved at 60° C. to prepare an oily phase. The oily phase was added to the aqueous phase, and the mixture was preliminarily emulsified by stirring. The emulsion was homogenized under a pressure of 50 kg/cm², sterilized at 142° C. for 4 seconds in VTIS (a UHT sterilizer manufactured by Alfa Labval Co.), again homogenized under a pressure of 50 kg/cm², and cooled to 5° C., followed by aging in a refrigerator for 24 hours. The resulting oil-in-water type emulsion exhibited markedly excellent physical properties, a fresh texture, and highly enhanced natural spread of flavor in the mouth as shown in Table 5 below.

EXAMPLE 11

An oil-in-water type emulsion was prepared by using the lysophospholipoprotein-containing material prepared in Example 1 according to the following formulation:

| | |
|---|---|
| Hardened soybean oil | 22.0% |
| Palm kernel oil | 19.0% |
| Corn oil | 4.0% |
| Skim milk powder | 2.0% |
| Sodium caseinate | 1.5% |
| Lysophospholipoprotein-containing material | 0.75% |
| Sucrose fatty acid ester | 0.2% |
| Lecithin | 0.5% |
| Glycerol diacetyltartaric acid fatty acid ester | 0.2% |
| Flavoring agent | 0.5% |
| Sodium hexametaphosphate | 0.1% |
| pH Adjusting agent | adequate amount |
| Water | 49.25% |

The lysophospholipid content of the emulsion was 0.057%.

The skim milk powder, sodium hexametaphosphate, and sodium caseinate were dissolved in water heated at 60° C. while stirring to prepare an aqueous phase. The aqueous phase was adjusted to a pH of 6.0 with the pH adjusting agent to aggregate the protein. Thereafter, the lysophospholipoprotein-containing material, sucrose fatty acid ester, and flavoring agent were dissolved therein. Separately, the hardened soybean oil, palm kernel oil, corn oil, lecithin, and glycerol diacetyltartaric acid fatty acid ester were mixed and dissolved at 60° C. to prepare an oily phase. The oily phase was added to the aqueous phase, and the mixture was preliminarily emulsified by stirring. The emulsion was homogenized under a pressure of 50 kg/cm², sterilized at 142° C. for 4 seconds in VTIS (a UHT sterilizer manufactured by Alfa Labval Co.), again homogenized under a pressure of 50 kg/cm², and cooled to 5° C., followed by aging in a refrigerator for 24 hours. The resulting oil-in-water type emulsion exhibited markedly excellent physical properties and flavor as shown in Table 5 below.

EXAMPLE 12

Whipped cream was prepared by using the lysophospholipoprotein-containing material prepared in Example 1 according to the following formulation:

| | |
|---|---|
| Hardened soybean oil | 7.0% |
| Hardened coconut oil | 13.0% |
| Hardened rapeseed oil | 3.0% |
| Skim milk powder | 4.0% |
| Lysophospholipoprotein-containing material | 0.75% |
| Sucrose fatty acid ester | 0.2% |
| Lecithin | 0.5% |
| Glycerol diacetyltartaric acid fatty acid ester | 0.2% |
| Granulated sugar | 4.0% |
| Glucose | 2.0% |
| Dextrin | 2.0% |
| Condensed milk | 6.0% |
| Flavoring agent | 0.5% |
| Guar gum | 0.05% |
| Water | 56.8% |

The lysophospholipid content of the emulsion was 0.057%.

The skim milk powder, lysophospholipoprotein-containing material, sucrose fatty acid ester, granulated sugar, dextrin, condensed milk, flavoring agent, glucose, and guar gum were dissolved in water heated at 60° C. while stirring to prepare an aqueous phase. Separately, the hardened soybean oil, hardened coconut oil, hardened rapeseed oil, lecithin, and glycerol diacetyltartaric acid fatty acid ester were mixed and dissolved at 60° C. to prepare an oily phase. The oily phase was added to the aqueous phase, and the mixture was preliminarily emulsified by stirring. The emulsion was homogenized under a pressure of 50 kg/cm² sterilized at 142° C. for 4 seconds in VTIS (a UHT sterilizer manufactured by Alfa Labval Co.), again homogenized under a pressure of 50 kg/cm² and cooled to 5° C., followed by aging in a refrigerator for 24 hours. The oil-in-water type emulsion was beaten to an overrun (hereinafter defined) of 130% to give whipped cream. The resulting oil-in-water type emulsion exhibited markedly excellent physical properties and flavor as shown in Table 5 below.

COMPARATIVE EXAMPLE 7

An oil-in-water type emulsion was prepared in the same manner as in Example 9, except for omitting the lysophospholipoprotein-containing material and replacing lecithin with 0.130% of lysolecithin (lyso form content: 44%) so as to give the same lysophospholipid content as in the formulation of Example 9, according to the following formulation:

| | |
|---|---|
| Hardened soybean oil | 22.0% |
| Palm kernel oil | 19.0% |
| Corn oil | 4.0% |
| Skim milk powder | 5.0% |
| Sucrose fatty acid ester | 0.2% |
| Lysolecithin | 0.13% |
| Glycerol diacetyltartaric acid fatty acid ester | 0.2% |
| Flavoring agent | 0.5% |
| Sodium hexametaphosphate | 0.02% |
| Water | 48.95% |

The lysolipid content in the emulsion was 0.057%.

The resulting oil-in-water type emulsion was inferior in all terms of flavor, machining resistance, and heat shock resistance as shown in Table 8 below. With respect to flavor, in particular, bitterness peculiar to lysolecithin was felt.

EXAMPLE 13

An oil-in-water type emulsion was prepared by using the lysophospholipoprotein-containing material prepared in Example 1 according to the following formulation:

| | |
|---|---|
| Hardened soybean oil | 22.0% |
| Palm kernel oil | 19.0% |
| Corn oil | 4.0% |
| Skim milk powder | 5.0% |
| Lysophospholipoprotein-containing material | 0.75% |
| Sucrose fatty acid ester | 0.2% |
| Lecithin | 0.5% |
| Glycerol diacetyltartaric acid fatty acid ester | 0.2% |
| Flavoring agent | 0.5% |
| Sodium hexametaphosphate | 0.02% |
| Water | 47.83% |

The skim milk powder, lysophospholipoprotein-containing material, sucrose fatty acid ester, sodium hexametaphosphate, and flavoring agent were dissolved in water heated at 60° C. while stirring to prepare an aqueous phase. Separately, the hardened soybean oil, palm kernel oil, corn oil, lecithin, and glycerol diacetyltartaric acid fatty acid ester were mixed and dissolved at 60° C. to prepare an oily phase. The oily phase was added to the aqueous phase, and the mixture was preliminarily emulsified by stirring. The emulsion was sterilized at 142° C. for 4 seconds in VTIS (a UHT sterilizer manufactured by Alfa Labval Co.), homogenized in a centrifugal homogenizer Clarificator (manufactured by Alfa Labval Co.), and cooled to 5° C. The resulting oil-in-water type emulsion comprised fat droplets having a remarkably uniform size and exhibited noticeably excellent physical properties and flavor as shown in Table 6 below.

EXAMPLE 14

An oil-in-water type emulsion was prepared by using the lysophospholipoprotein-containing material prepared in Example 1 according to the following formulation:

| | |
|---|---|
| Hardened soybean oil | 22.0% |
| Palm kernel oil | 19.0% |
| Corn oil | 4.0% |
| Lysophospholipoprotein-containing material | 0.75% |
| Sucrose fatty acid ester | 0.2% |
| Lecithin | 0.5% |

-continued

| | |
|---|---|
| Glycerol diacetyltartaric acid fatty acid ester | 0.2% |
| Flavoring agent | 0.5% |
| Sodium hexametaphosphate | 0.02% |
| Water | 32.83% |
| Aqueous Solution of Skim Milk Powder: | |
| Skim milk powder | 5.0% |
| Water | 15.0% |

The lysophospholipoprotein-containing material, sucrose fatty acid ester, sodium hexametaphosphate, and flavoring agent were dissolved in water heated at 60° C. while stirring to prepare an aqueous phase. Separately, the hardened soybean oil, palm kernel oil, corn oil, lecithin, and glycerol diacetyltartaric acid fatty acid ester were mixed and dissolved at 60° C. to prepare an oily phase. The oily phase was added to the aqueous phase, and the mixture was preliminarily emulsified by stirring. The emulsion was sterilized at 142° C. for 4 seconds in VTIS (a UHT sterilizer manufactured by Alfa Labval Co.) and homogenized in a membrane emulsifier equipped with a hydrophilic porous membrane having a pore size of 0.5 μm (produced by Ise Kagaku Kogyo K.K.). Thereafter, the skim milk powder aqueous solution was added thereto, followed by cooling to 5° C. The resulting oil-in-water type emulsion comprised fat droplets having a remarkably uniform size and exhibited markedly excellent physical properties and flavor as shown in Table 6 below.

TABLE 2

| | Example-1 | | Example-2 | | Example-3 | |
|---|---|---|---|---|---|---|
| Lysophospholipo-protein-containing material | 0.45 | | 0.075 | | 0.15 | |
| Lysophospholipid | 0.034 | | 0.006 | | 0.011 | |
| Heat shock | before | after | before | after | before | after |
| 1)Viscosity (cp) | 170 | 250 | 410 | 600 | 350 | 550 |
| 2)Beating time | 2'00" | 1'08" | 1'50" | 55" | 1'55" | 46" |
| 3)Overrun (%) | 138 | 118 | 109 | 86 | 119 | 94 |
| 4)Shapability | good | good | medium | good | good | good |
| 5)Stiffness of whipped cream (g) | | | | | | |
| Initial | 57 | 68 | 108 | 94 | 90 | 102 |
| 6)After beating test | 64 | | 110 | | 88 | |
| 7)Heat shock resistance | good | | medium | | medium | |
| 8)Machining resistance | good | | medium | | good | |
| 9)Water retention | good | | good | | good | |
| 10)Freshness | good | | medium | | medium | |
| 11)Spreadability in the mouth | good | | medium | | medium | |
| Total judgement | good | | medium | | medium | |

TABLE 3

| | Example-4 | | Example-5 | | Example-6 | |
|---|---|---|---|---|---|---|
| Lysophospholipo-protein-containing material | 0.3 | | 0.6 | | 0.75 | |
| Lysophospholipid | 0.023 | | 0.046 | | 0.057 | |
| Heat shock | before | after | before | after | before | after |
| 1)Viscosity (cp) | 250 | 330 | 140 | 200 | 120 | 170 |
| 2)Beating time | 2'00" | 1'08" | 1'58" | 1'08" | 2'00" | 1'08" |
| 3)Overrun (%) | 124 | 108 | 138 | 115 | 141 | 129 |
| 4)Shapability | good | good | good | good | good | good |

TABLE 3-continued

| | Example-4 | | Example-5 | | Example-6 | |
|---|---|---|---|---|---|---|
| 5)Stiffness of whipped cream (g) | | | | | | |
| Initial | 66 | 75 | 57 | 68 | 62 | 61 |
| 6)After beating test | 54 | | 55 | | 56 | |
| 7)Heat shock resistance | good | | good | | good | |
| 8)Machining resistance | good | | good | | good | |
| 9)Water retention | good | | good | | good | |
| 10)Freshness | good | | good | | good | |
| 11)Spreadability in the mouth | good | | good | | good | |
| Total judgement | good | | good | | good | |

TABLE 4

| | Example-7 | | Example-8 | | Example-9 | |
|---|---|---|---|---|---|---|
| Lysophospholipo-protein-containing material | 0.95 | | 1.30 | | 0.75 | |
| Lysophospholipid | 0.072 | | 0.098 | | 0.057 | |
| Heat shock | before | after | before | after | before | after |
| 1)Viscosity (cp) | 100 | 150 | 100 | 150 | 100 | 150 |
| 2)Beating time | 2'10" | 1'15" | 2'18" | 1'15" | 2'15" | 1'20" |
| 3)Overrun (%) | 145 | 131 | 145 | 137 | 132 | 107 |
| 4)Shapability | good | good | medium | good | good | good |
| 5)Stiffness of whipped cream (g) | | | | | | |
| Initial | 52 | 60 | 49 | 55 | 60 | 73 |
| 6)After beating test | 44 | | 36 | | 72 | |
| 7)Heat shock resistance | good | | good | | good | |
| 8)Machining resistance | medium | | medium | | good | |
| 9)Water retention | medium | | medium | | good | |
| 10)Freshness | good | | good | | good | |
| 11)Spreadability in the mouth | good | | good | | good | |
| Total judgement | medium | | medium | | good | |

TABLE 5

| | Example-10 | | Example-11 | | Example-12 | |
|---|---|---|---|---|---|---|
| Lysophospholipo-protein-containing material | 0.75 | | 0.75 | | 0.75 | |
| Lysophospholipid | 0.057 | | 0.057 | | 0.057 | |
| Heat shock | before | after | before | after | before | after |
| 1)Viscosity (cp) | 40 | 40 | 140 | 190 | 140 | 190 |
| 2)Beating time | 2'55" | 1'36" | 2'05" | 1'05" | 2'05" | 1'05" |
| 3)Overrun (%) | 144 | 108 | 123 | 102 | 123 | 102 |
| 4)Shapability | good | medium | good | good | good | good |
| 5)Stiffness of whipped cream (g) | | | | | | |
| Initial | 68 | 92 | 58 | 64 | 58 | 64 |
| 6)After beating test | 54 | | 59 | | 59 | |
| 7)Heat shock resistance | good | | good | | good | |
| 8)Machining resistance | good | | good | | good | |
| 9)Water retention | medium | | good | | good | |
| 10)Freshness | good | | good | | good | |
| 11)Spreadability in the mouth | good | | good | | good | |
| Total judgement | good | | good | | good | |

TABLE 6

|  | Example-13 | | Example-14 | |
|---|---|---|---|---|
| Lysophospholipoprotein-containing material | 0.75 | | 0.75 | |
| Lysophospholipid | 0.057 | | 0.057 | |
| Heat shock | before | after | before | after |
| 1) Viscosity (cp) | 85 | 130 | 100 | 120 |
| 2) Beating time | 2'23" | 1'19" | 2'05" | 1'50" |
| 3) Overrun (%) | 140 | 127 | 130 | 122 |
| 4) Shapability | good | good | good | good |
| 5) Stiffness of whipped cream (g) | | | | |
| Initial | 59 | 72 | 55 | 61 |
| 6) After beating test | 65 | | 58 | |
| 7) Heat shock resistance | good | | good | |
| 8) Machining resistance | good | | good | |
| 9) Water retention | good | | good | |
| 10) Freshness | good | | good | |
| 11) Spreadability in the mouth | good | | good | |
| Total judgement | good | | good | |

TABLE 7

|  | Comparative Example-1 | | Comparative Example-2 | | Comparative Example-3 | |
|---|---|---|---|---|---|---|
| Lysophospholipo-protein-containing material | 0.6 | | 0.6 | | 0.6 | |
| Lysophospholipid | 0.046 | | 0.046 | | 0.046 | |
| Heat shock | before | after | before | after | before | after |
| 1) Viscosity (cp) | 100 | 170 | 60 | 70 | 90 | 90 |
| 2) Beating time | 3'43" | 50" | 4'41" | 1'05" | 4'04" | 45" |
| 3) Overrun (%) | 124 | 95 | 137 | 83 | 120 | 71 |
| 4) Shapability | good | poor | good | poor | good | poor |
| 5) Stiffness of whipped cream (g) | | | | | | |
| Initial | 66 | 190 | 68 | 154 | 89 | 164 |
| 6) After beating test | 60 | | 76 | | 72 | |
| 7) Heat shock resistance | poor | | poor | | poor | |
| 8) Machining resistance | good | | good | | good | |
| 9) Water retention | medium | | poor | | medium | |
| 10) Freshness | poor | | medium | | poor | |
| 11) Spreadability in the mouth | poor | | poor | | poor | |
| Total judgement | poor | | poor | | poor | |

TABLE 8

|  | Comparative Example-4 | | Comparative Example-5 | | Comparative Example-6 | | Comparative Example-7 | |
|---|---|---|---|---|---|---|---|---|
| Lysophospholipoprotein-containing material | 0.6 | | — | | — | | — | |
| Lysophospholipid | 0.046 | | 0.057 | | — | | 0.057 | |
| Heat shock | before | after | before | after | before | after | before | after |
| 1) Viscosity (cp) | 110 | 200 | 240 | 380 | 50 | 40 | 60 | 60 |
| 2) Beating time | 4'25" | 50" | 2'10" | 1'18" | 4'12" | 1'30" | 2'45" | 54" |
| 3) Overrun (%) | 134 | 72 | 150 | 121 | 137 | 95 | 129 | 63 |
| 4) Shapability | medium | poor | medium | poor | medium | poor | medium | poor |
| 5) Stiffness of whipped cream (g) | | | | | | | | |
| Initial | 72 | 185 | 84 | 159 | 68 | 204 | 68 | 222 |
| 6) After beating test | 114 | | 115 | | 178 | | 159 | |
| 7) Heat shock resistance | poor | | poor | | poor | | poor | |
| 8) Machining resistance | medium | | poor | | poor | | poor | |
| 9) Water retention | poor | | medium | | poor | | poor | |
| 10) Freshness | medium | | poor | | very poor | | very poor | |
| 11) Spreadability in the mouth | poor | | poor | | very poor | | very poor | |
| Total judgement | poor | | poor | | poor | | poor | |

Note:
1) Viscosity:
 Measured with a viscometer RION VT-04 Model.
2) Beating Time:
 The time required for 600 ml of cream to reach the optimum foamed condition by beating in a vertical mixer at 700 rpm.
3) Overrun:
 A percent increase in volume calculated according to equation:

[(Weight of a given volume of cream)—(Weight of a given volume of whipped cream)]/(Weight of a given volume of whipped cream)×100

4) Shapability:
 Workability in shaping whipped cream to make 50 flowers.
5) Stiffness of whipped cream:
 Stiffness of cream beaten until the optimum foamed condition is reached, measured with Fudo Rheometer equipped with an adapter for measuring curd.
8) Beater test:
 Substitutional test for evaluation of machining resistance. After being left to stand at 15° C. for 1 hour, whipped cream is stirred in a flat beater at the minimum speed for 1 minute, and the stiffness is measured. Whipped cream showing too high the stiffness in this test would be hardened on being stirred mechanically by means of a pump, etc. and therefore could not be put into machinery. On the other hand, whipped cream showing too low the stiffness in the test is lacking in shape retention and of no commercial value.
7) Heat shock resistance:
 The degree of change in condition when cream is allowed to stand at 25° C. for 4 hours followed by cooling ing to 5° C. and then beaten, totally evaluated from viscosity, beating time, overrun, and stiffness.
8) Machining resistance:
 Evaluated from the stiffness as measured in the beater test, graded as follows.
 Good . . . 50 to 100
 Medium . . . 30 to 50, or 100 to 150
 Poor . . . less than 30 or more than 150
9) Water retention:
 The degree of water separation when flowers formed of whipped cream are allowed to stand in a thermostat set at 20° C. for 20 hours.

10) Freshness:
   Freshness felt in the mouth.
11) Spreadability in the mouth:
   Feeling of instantaneous melting in the mouth.

What is claimed is:

1. An oil-in-water type emulsion comprising (1) an emulsifying agent, (2) a lysophospholipoprotein, (3) a protein other than said lysophospholipoprotein as component (2) (4) oil and (5) water, said protein (3) having a larger molecular weight than the protein as component (2).

2. The oil-in-water type emulsion according to claim 1, wherein said protein as component (3) is casein micelles or a casein micelle-containing material.

3. The oil-in-water type emulsion according to claim 1, wherein said lysophospholipoprotein as component (2) is of whole egg origin or of egg yolk origin.

4. The oil-in-water type emulsion according to claim 1, wherein said lysophospholipoprotein as component (2) is of milk origin.

5. The oil-in-water type emulsion according to claim 1, wherein said lysophospholipoprotein as component (2) has a conversion of 10% or higher.

6. The oil-in-water type emulsion according to claim 1, wherein said protein as component (3) is lactalbumin having been previously subjected to heat treatment in an aqueous solution to polymerize so as to have a substantially larger apparent molecular weight than said lysophospholipoprotein as component (2).

7. The oil-in-water type emulsion according to claim 1, wherein said protein as component (3) is at least one member selected from sodium caseinate, calcium caseinate, casein submicelles, and a casein submicelle-containing material each of which has been previously polymerized by reducing the pH of its aqueous solution so as to have a substantially larger apparent molecular weight than said lysophospholipoprotein as component (2).

8. The oil-in-water type emulsion according to claim 1, wherein said oil-in-water type emulsion is whipped cream.

9. The oil-in-water type emulsion according to claim 1, wherein said oil-in-water type emulsion has an emulsified structure in which said emulsifying agent as component (1), said lysophospholipoprotein as component (2) and said protein as component (3) are adsorbed onto the surface of fat droplets in this order.

10. An oil-in-water type emulsion comprising (1) an emulsifying agent, (2) a lysophospholipoprotein, (2') a phospholipoprotein, and (3) a protein other than the proteins as components (2) and (2') (4) oil and (5) water, said protein (3) having a larger molecular weight than the proteins as components (2) and (2').

11. The oil-in-water type emulsion according to claim 10, wherein said oil-in-water type emulsion has an emulsified structure in which said emulsifying agent as component (1), said lysophospholipoprotein and phospholipoprotein as components (2) and (2'), and said protein as component (3) are adsorbed onto the surface of fat droplets in this order.

12. The oil-in-water type emulsion according to claim 10, wherein said protein as component (3) is casein micelles or a casein micelle-containing material.

13. The oil-in-water type emulsion according to claim 10, wherein said lysophospholipoprotein as component (2) is of whole egg origin or of egg yolk origin.

14. The oil-in-water type emulsion according to claim 10, wherein said lysophospholipoprotein as component (2) is of milk origin.

15. The oil-in-water type emulsion according to claim 10, wherein said lysophospholipoprotein as component (2) has a conversion of 10% or higher.

16. The oil-in-water type emulsion according to claim 10, wherein said protein as component (3) is lactalbumin having been previously subjected to heat treatment in an aqueous solution to polymerize so as to have a substantially larger apparent molecular weight than said lysophospholipoprotein as component (2).

17. The oil-in-water type emulsion according to claim 10, wherein said protein as component (3) is at least one member selected from sodium caseinate, calcium caseinate, casein submicelles, and a casein submicelle-containing material each of which has been previously polymerized by reducing the pH of its aqueous solution as to have a substantially larger apparent molecular weight than said lysophospholiproprotein as component (2).

18. The oil-in-water type emulsion according to claim 10, wherein said oil-in-water type emulsion is whipped cream.

19. A process for producing an oil-in-water type emulsion comprising (1) an emulsifying agent, (2) a lysophospholipoprotein, and (3) a protein other than said lysophospholipoprotein as component (2), said protein (3) having a larger molecular weight than the protein as component (2), which comprises preliminarily emulsifying an aqueous phase containing said emulsifying agent (1) and said lysophospholipoprotein (2) with an oil phase to obtain an emulsion, homogenizing the emulsion, and then adding said protein (3) to the homogenate.

20. A process according to claim 19, wherein said homogenizing is carried out by means of a centrifugal homogenizer.

21. A process for producing an oil-in-water type emulsion comprising (1) an emulsifying agent, (2) a lysophospholipoprotein, and (3) a protein other than said lysophospholipoprotein as component (2), said protein (3) having a larger molecular weight than the protein as component (2), which comprises emulsifying an aqueous phase containing said emulsifying agent (1) and said lysophospholipoprotein (2) with an oil phase by means of a membrane emulsifier and then adding said protein (3) thereto.

* * * * *